C. E. MOLESWORTH.
RECTIFIER FOR REFRIGERATING APPARATUS.
APPLICATION FILED SEPT. 9, 1913.
1,128,483. Patented Feb. 16, 1915.
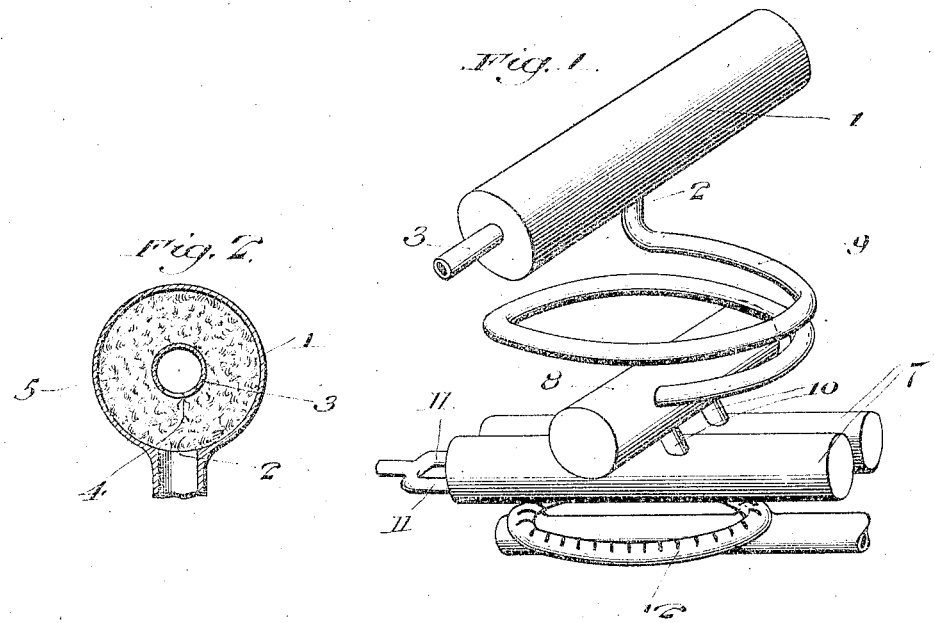
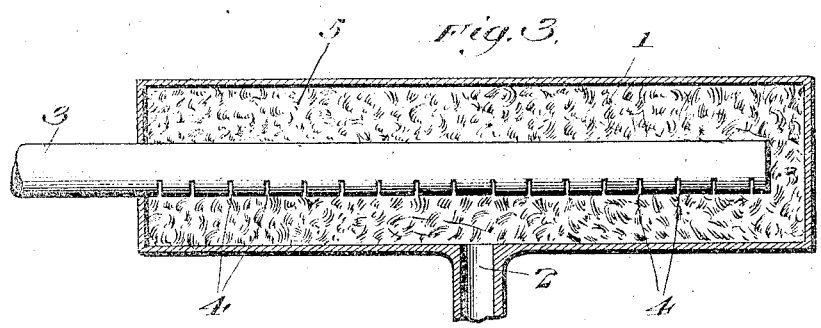

UNITED STATES PATENT OFFICE.

CLYDE E. MOLESWORTH, OF LOS ANGELES, CALIFORNIA.

RECTIFIER FOR REFRIGERATING APPARATUS.

1,128,483.

Specification of Letters Patent.   Patented Feb. 16, 1915.

Application filed September 9, 1913.   Serial No. 788,791.

*To all whom it may concern:*

Be it known that I, CLYDE E. MOLESWORTH, a citizen of the United States, residing at Los Angeles, in the county of Los Angeles and State of California, have invented a new and useful Rectifier for Refrigerating Apparatus, of which the following is a specification.

This invention relates to means for dehydrating the gas or vapor used in a refrigerating apparatus, operating on the ammonia absorption principle. In such apparatus the vapor which passes off from the generator contains a considerable percentage of water and it is essential to economy and efficiency of the operation that this water should be removed from the gas before it is condensed.

The main object of the present invention is to perform this dehydrating operation in an effective and satisfactory manner.

Other objects of the invention will appear hereinafter.

The accompanying drawings illustrate an embodiment of my invention, and referring thereto: Figure 1 is a perspective view of the rectifier, showing also the connections thereof with the generator. Fig. 2 is a transverse section of the rectifier. Fig. 3 is a longitudinal section thereof.

The rectifier comprises the casing or tank 1 formed, for example, as a metal cylinder, and having an inner tube, preferably at the bottom 2 of its cylindrical wall and intermediate the ends thereof, and having an outlet in the form of a pipe 3 which extends longitudinally in the cylinder and is provided with slits or perforations 4 in its bottom, said slits or perforations being distributed along the pipe so as to provide for the outflow of the gas from the tank or casing 1 into the pipe from different points along the length of the tank. The interior of the tank or casing 1 is occupied with mineral wool, indicated at 5, which fills the space between the walls of the casing 1 and the outlet pipe 3, so that the gas in the casing has to pass through this mineral wool before it reaches the perforations 4 in the outlet pipe.

The above described rectifying means is adapted to effect the final rectification or dehydration of the gas or vapor, and is preferably connected with the still or generator indicated at 7, in Fig. 1, through intermediate or preliminary dehydration means, indicated at 9, the outlet pipes 10 for the generator leading into the settling tank 8, which is of considerable volume, so that the velocity of the gas passing therethrough is reduced and the larger particles of entrained water are allowed to settle. The coil 9 leads from the tank 8 to the inlet tube of the rectifier 1, said coils being of sufficient length and being exposed to a cooling medium in such manner that by the time the gas or vapor reaches the rectifier 1, it is reduced to a temperature approximating that of condensation of the gas or vapor.

Any suitable cooling means may be provided for the coil 9 and rectifier 1. For example, these parts may be immersed in a cooling liquid, supplied in any suitable manner, or by providing sufficient surface the atmospheric air surrounding this part may be used for cooling the same. The generator 7 may be of any desired form, consisting, for example, of cylinders, adapted to receive the binary liquid consisting of the refrigerating gas or vapor and liquid for absorbing the same. The burner or heater for heating the generator or still is indicated at 12.

The rectifier above described is used in connection with refrigeration by means of any suitable refrigerating medium on the absorption system and the operation thereof will be described in connection with a system in which ammonia is used as a refrigerating medium and water is used as the absorbing liquid.

The operation is as follows: When the still or generator 7 is heated, the ammonia gas or vapor passes through the outlet pipe 10 into the tank 8, wherein any entrained water particles settle and drain back into the generator. The gas or vapor passes on from the tank 8 through the coil 9 and is cooled therein, resulting in condensation of most of the water vapor, carried over with the gas or vapor of the refrigerating medium, such condensed water draining back into the tank 8 and generator 7. The gas or vapor, when it reaches the rectifying casing 1 is nearly at the temperature of condensation of the refrigerating medium or is brought nearly to said temperature by the cooling thereof in the rectifying casing. In passing through the body or mass of mineral wool 5 in casing 1 the gas or vapor is brought into contact with an enormous surface of solid material. The cooling effect of such surface and the entangling and filtering effect of the fibers of the mineral wool serve to catch and hold the condensed moisture, so that the gas or vapor by the time it reaches the outlet perforations 4 is substantially dehydrated. The gas or vapor passing through the outlet 4 into the outer pipe 3 is delivered by pipe 3 to any suitable condensing means to effect the next operation in the refrigerating cycle. The water which is collected or caught in the mineral wool in casing 1 gradually drains back through the inlet tube. The refrigerating fluid is eventually returned to generator 1 by pipe 11 extending into the generator cylinders.

What I claim is:

A rectifier comprising a casing having an inlet, an outlet for said casing formed as a pipe extending within the casing, and having a series of perforations along its length and mineral wool within said casing between the inlet and said outlet pipe.

In testimony whereof, I have hereunto set my hand at Los Angeles, California this 29th day of August, 1913.

CLYDE E. MOLESWORTH.

In presence of—
A. P. KNIGHT,
LORA M. BOWERS.